United States Patent
Smith et al.

(10) Patent No.: US 7,146,276 B2
(45) Date of Patent: Dec. 5, 2006

(54) METHOD FOR DETERMINING DRIVING TASK DEMAND BASED ON SPEED VARIABILITY

(75) Inventors: Matthew R. Smith, Westfield, IN (US); Harry Zhang, Carmel, IN (US); Gregory K. Scharenbroch, Kokomo, IN (US); Gerald J. Witt, Carmel, IN (US); Timothy J. Newman, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/939,778

(22) Filed: Sep. 13, 2004

(65) Prior Publication Data

US 2006/0058963 A1 Mar. 16, 2006

(51) Int. Cl.
  *B60Q 11/00* (2006.01)
  *G08B 21/00* (2006.01)
(52) U.S. Cl. .................. 701/301; 342/71; 180/168
(58) Field of Classification Search ............... 701/301, 701/96; 342/71, 70, 72, 109, 55; 340/903, 340/936, 439, 436, 459, 541; 180/168, 271, 180/272, 170, 171
See application file for complete search history.

(56) References Cited

U.S. PATENT DOCUMENTS

| | | | | |
|---|---|---|---|---|
| 4,158,841 A * | 6/1979 | Wuchner et al. | ............... | 342/71 |
| 6,031,484 A * | 2/2000 | Bullinger et al. | ............. | 342/72 |
| 6,591,192 B1 * | 7/2003 | Okamura et al. | ........... | 701/301 |
| 6,873,286 B1 * | 3/2005 | Albero et al. | ................. | 342/71 |
| 6,879,969 B1 * | 4/2005 | Engstrom et al. | ............. | 706/20 |
| 6,925,425 B1 * | 8/2005 | Remboski et al. | .......... | 702/188 |
| 7,034,668 B1 * | 4/2006 | Engelman et al. | .......... | 340/435 |
| 2005/0004761 A1 * | 1/2005 | Takahama et al. | .......... | 701/301 |
| 2005/0041529 A1 * | 2/2005 | Schliep et al. | ................ | 367/99 |

FOREIGN PATENT DOCUMENTS

| EP | 0 955 210 | 11/1999 |
|---|---|---|
| EP | 1 034 984 | 9/2000 |
| WO | WO 02/058962 | 8/2002 |

OTHER PUBLICATIONS

Nakayama, O., Futami, T., Nakamura, T., Boer, E., "Development of a Steering Entropy Method for Evaluation Driver Workload," SAE International, SAE Technical Paper Serial No. 1999-01-0892, International Congress and Exposition, Detroit, MI Mar. 1-4, 1999, 11 pages.
NewScientist.com XP002358009 "Smart assistant will cut driver distraction", retrieved Dec. 14, 2003.

* cited by examiner

*Primary Examiner*—Dalena Tran
(74) *Attorney, Agent, or Firm*—Jimmy L. Funke (57) ABSTRACT

A system and method of assessing the driving task demand on the driver of a vehicle, and further controlling one or more devices on the vehicle as a function of the assessed driver demand is provided. The method includes sensing a coverage zone in relation to a vehicle, determining a presence of one or more objects in the sensed zone, measuring speed of each detected object in the sensed zone, determining a variation in speed of one or more sensed objects, and determining a driving task demand signal indicative of driving task demand of the vehicle as a function of the measured speed variability. The method controls one or more devices on the vehicle based on the driving task demand signal. Alternately, the driving task demand signal is determined based on vehicle speed.

24 Claims, 5 Drawing Sheets

METHOD FOR DETERMINING DRIVING TASK DEMAND BASED ON SPEED VARIABILITY

TECHNICAL FIELD

The present invention generally relates to object detection and driver distraction systems on a vehicle and, more particularly, relates to a system and method of determining driving task demand for a vehicle driver.

BACKGROUND OF THE INVENTION

Automotive vehicles are increasingly equipped with various electronic entertainment and information systems and mobile multimedia devices, generally referred to herein as infotainment devices and systems. For example, automotive personal computing (PC) devices have been installed in vehicles to allow personal computing, web browsing, accessing e-mail, and other Internet access. Additionally, many vehicles are equipped with navigation systems, televisions, and video game systems. These and other infotainment systems typically include a human machine interface (HMI) for enabling a user to interface with the system. The HMI typically includes a display for viewing messages, navigational maps, video images, audio features, and other information. In addition, the HMI may include input controls for manipulation by a user to input commands to the infotainment system.

In order to reduce distraction to the driver (operator) of the vehicle, it may be desirable to inhibit the availability of some functions (features) of the infotainment system to the driver while the vehicle is in motion. For example, it may be desirable to limit the driver's ability to manipulate the HMI for use with a navigation system or cell phone when there is excessive risk of driver distraction. It may also be desirable to control other system operations, such as controlling the response time for a collision warning system, based on activity in the surrounding environment. Collision warning systems have been proposed to warn the driver of the vehicle of objects that pose a potential obstruction to the vehicle. It may be desirable to provide different levels of control of a collision warning system based on predictability of the surrounding environment.

When the driver is commanding a vehicle on a straight country road with no traffic during the daytime, there is less demand on the driver for attention. In this situation, the driver typically can predict what will happen within the next few seconds, despite a brief driver distraction. Conversely, when driving on a multi-lane winding road with erratic traffic, the driver is subjected to a higher driving task demand that requires more attention. In this situation, when the driver is distracted, there is a higher probability that a quicker response may be required. Conventional infotainment control systems and collision warning systems generally do not provide dynamic control of various features on a vehicle to permit the driver to engage distracting features in low traffic on straight roads, and to shield the driver against excessive distraction when driving in higher risk situations.

It is therefore desirable to provide for a method and system of assessing the driving task demand on the driver of a vehicle. It is further desirable to provide for a system and method that may dynamically adjust one or more devices on the vehicle based on the assessed driving task demand.

SUMMARY OF THE INVENTION

The present invention provides for a system and method of assessing the driving task demand on the driver of a vehicle, and further controls one or more devices on the vehicle as a function of the assessed driving task demand. According to one aspect of the present invention, the method includes the steps of sensing a coverage zone in relation to a vehicle, determining a presence of one or more objects in the sensed zone, and measuring speed of each detected object in the sensed zone. The method also includes the steps of determining a variation in speed of one or more sensed objects and determining a driving task demand signal indicative of driving task demand as a function of the measured speed variability. According to a further aspect of the present invention, the method may control one or more devices on the vehicle based on the assessed driving task demand signal.

According to a further aspect of the present invention, a system is provided including a sensor for sensing a presence of one or more objects in a coverage zone in relation to a host vehicle and determining speed of each object sensed. The system also includes a device located on the vehicle and having a user interface for operating with an occupant in the host vehicle. The system further includes a controller for processing the speed signal and calculating a speed variability thereof. The controller further determines a driving task demand signal as a function of the speed variability and controls the device as a function of the driving task demand signal.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
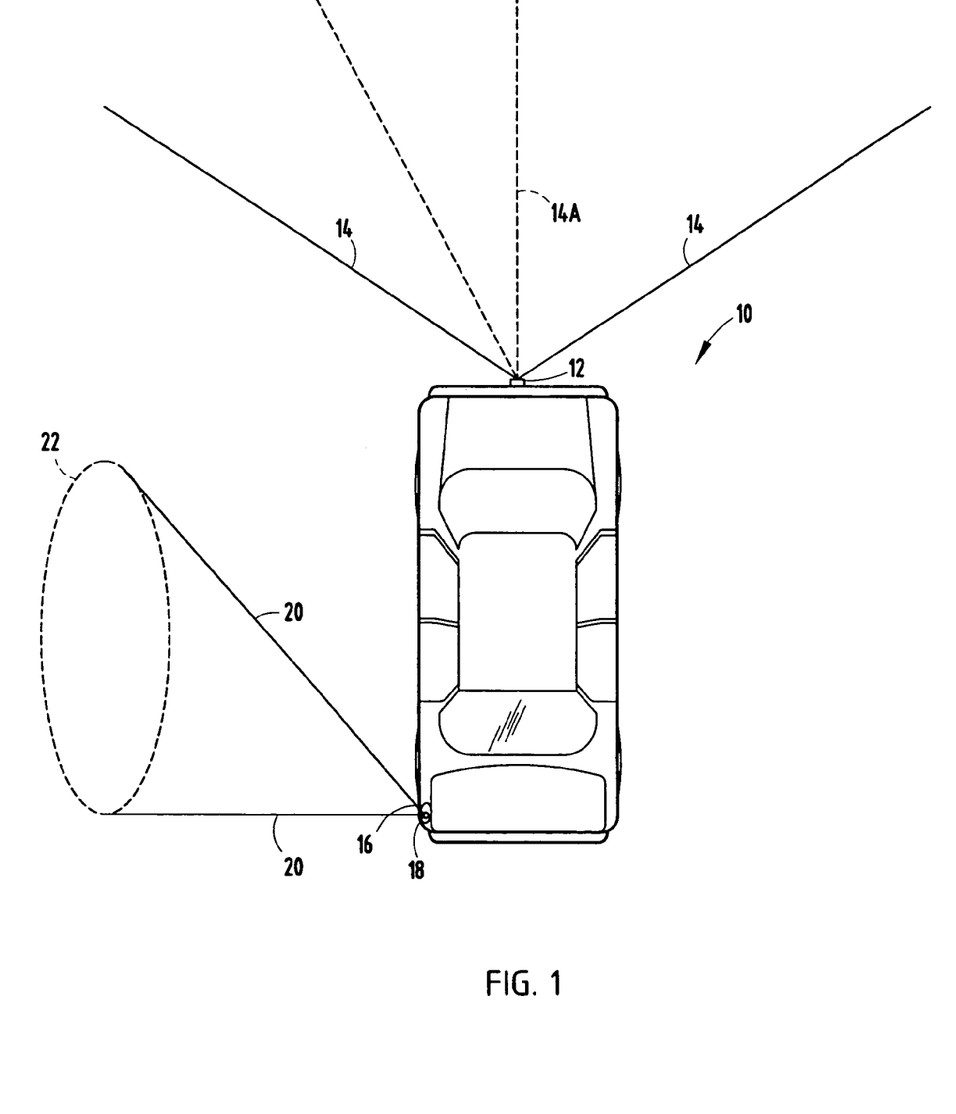
FIG. 1 is a top view of a vehicle employing a forward looking radar and side infrared sensing system for use in assessing driving task demand according to the present invention.

Referring to FIG. 1, an automotive vehicle 10 is generally illustrated equipped with a forward looking radar (FLR) system and a side view infrared (IR) sensing system, both for detecting target objects in coverage zone(s) proximate to the vehicle 10. The FLR system detects one or more objects forward of the host vehicle 10 and determines range and range rate for each detected object. The side view IR sensing system detects objects to the side of the host vehicle 10.

The FLR system includes a radar sensor 12 mounted to vehicle 10 to cover a desired field of view coverage zone 14 in front of host vehicle 10. The radar sensor 12 may include a single sensor or a plurality of sensors arranged to cover the coverage zone 14 to sense the presence of one or more objects. In one embodiment, sensor 12 may include a single scanning Doppler radar sensor that covers a narrow angle zone 14A that scans throughout the coverage zone 14. The radar sensor 12 may include a commercially off-the-shelf microwave Doppler radar sensor capable of sensing at least twenty objects, for example. However, it should be appreciated that other detecting sensors including other types of radar sensors, video imaging cameras, and laser sensors may be employed to detect the presence of single or multiple objects, and determine the range and range rate measurement of each object.

The radar sensor 12 measures both the range (radial distance) R to the sensed target object and further measures the range rate (time rate of change of radial distance) $\dot{R}$ of each detected target object. The range R is the estimated radial distance between the host vehicle 10 and each sensed object. The range rate $\dot{R}$ is the estimated rate of change of the sensed range R (i.e., speed) of the object as a function of time relative to the host vehicle 10. The radar sensor 12 provides both the range R and range rate $\dot{R}$ data, relative to the position and speed of the host vehicle 10. However, it should be appreciated that the radar sensor 12 could otherwise provide absolute speed and range information for determining speed variability of sensed objects proximate to the host vehicle 10.

The side view sensing system employs a thermal radiation detector 18, in the form of an infrared (IR) sensor, according to one embodiment. The thermal detector 18 is shown mounted on the host vehicle 10 and is configured to cover a coverage zone 20 having a field of view that extends onto a region 22 of the roadway adjacent the side of the host vehicle 10. In the embodiment shown and described herein, the thermal detector 18 is located in the rear tail lamp assembly 16 of the host vehicle 10. However, it should be appreciated that thermal detector 18 may be located at various other locations onboard the host vehicle 10 to sense thermal energy (temperature) in the coverage zone 20 and determine the presence of one or more objects. For example, the thermal detector 18 could be located in a side body panel or on an exterior rearview mirror housing of the host vehicle 10.

According to one embodiment, the thermal detector sensor 18 may include an infrared (IR) sensor employing a thermopile sensor for sensing temperature within coverage zone 20. One example of a commercially available thermal detector is the MLX90601 infrared thermometer module, which is commercially available from Melexis Microelectronics Integrated Systems. The aforementioned infrared thermometer module employs a thermopile sensor as the infrared sensing element for recording remote temperature measurements and provides signal conditioning, linearization, and ambient temperature compensation. It should further be appreciated that other types of object detecting sensors may be employed in place of a thermal detector 18, including a side view radar sensor, imaging camera or other sensing devices for determining the presence of one or more objects and/or sensing a parameter that may be useful for determining speed variability of objects proximate to the host vehicle 10.

Figure 2:
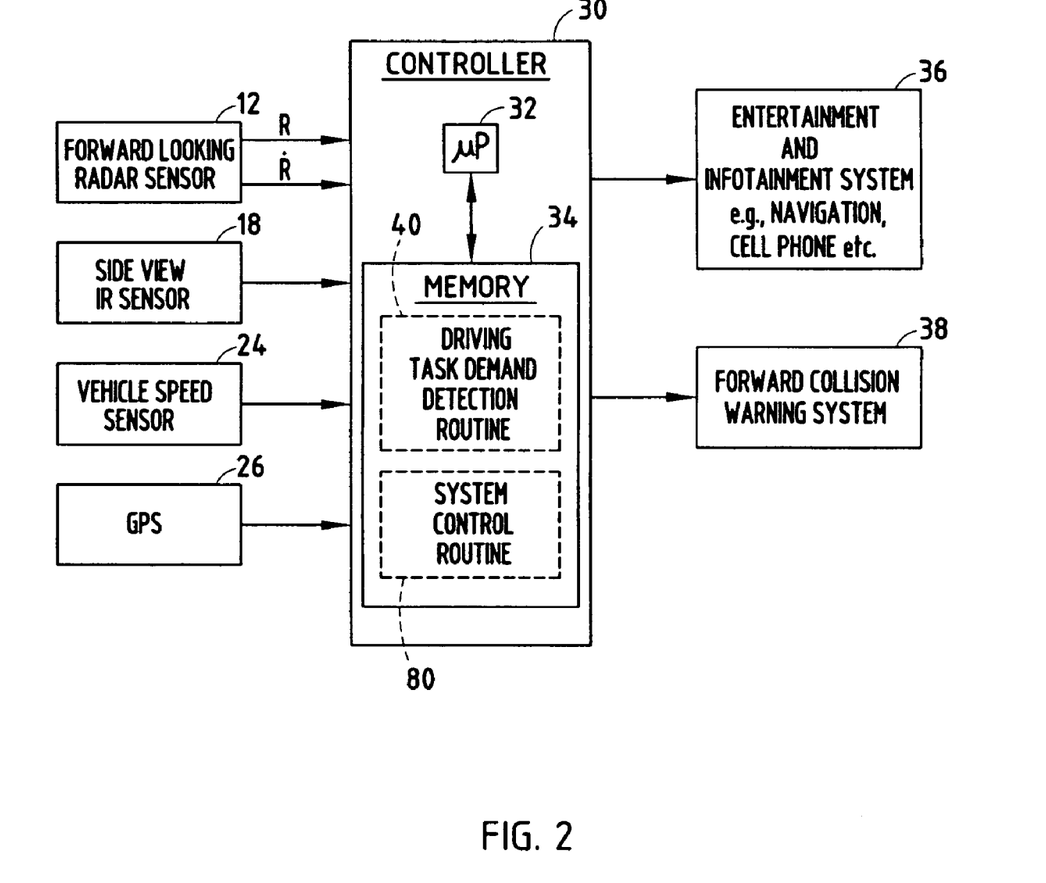
FIG. 2 is a block diagram illustrating a system for assessing driving task demand and controlling one or more devices on the vehicle.

Referring to FIG. 2, a workload management system is generally shown including the forward looking radar sensor 12 and the side view thermal detector 18. Each of the sensors 12 and 18 detects the presence of one or more objects in the respective coverage zones 14 and 20. Radar sensor 12 determines the range R from the host vehicle 10 to each detected object, and further detects the range rate $\dot{R}$ relative to the host vehicle 10. The range and range rate signals R and $\dot{R}$ are input to a controller 30. Sensor 18 generates signal indicators of the presence of an object.

The controller 30 processes the range and range rate signals R and $\dot{R}$ for each object detected with the forward looking radar sensor 12 and the signals from the side view thermal detector 18. The controller 30 also receives a vehicle speed signal 24 indicative of speed of the host vehicle 10. The controller 30 further receives GPS signals from a global positioning system (GPS) 26 device which provides position information, time of day, and velocity information for the host vehicle 10.

The controller 30 processes the input signals and determines a driving task demand signal based on speed variability of objects detected relative to the host vehicle 10. The controller 30 further is able to control any of a number of devices and associated functions/features employed onboard the host vehicle 10. For example, an entertainment and infotainment system 36, which may include navigation, cell phone, and other devices may be controlled by controller 30 based on the driving task demand signal. Additionally, the host vehicle 10 may include a forward collision warning system 38. The controller 30 may control devices associated with operation of the forward collision warning system 38 based on the determined driving task demand signal.

The controller 30 includes a microprocessor 32 and memory 34. The microprocessor 32 may include a conventional microprocessor having the capability for processing algorithms and data. Memory 34 may include read-only memory (ROM), random access memory (RAM), flash memory, and other commercially available volatile and non-volatile memory devices. Stored within memory 34 and processed by microprocessor 32 is a driving task demand detection routine 40 for detecting speed variability and determining a driving task demand signal. Also stored in memory 34 are one or more system control routines 80 for controlling any of a number of vehicle system/devices based on the driving task demand signal.

In a first embodiment, the controller 30 monitors the sensed range and range rate signals R and $\dot{R}$ received from the forward looking radar sensor 12 and the signals from the side view infrared sensor, for each object detected in the corresponding coverage zones. The controller 30 then processes the range and range rate signals R and $\dot{R}$ for each object detected by sensor 12 and determines the variability of speed for each object relative to the host vehicle 10. This includes calculating the change in speed of each object and calculating a speed variance signal based on a speed variance equation, according to a first embodiment. According to a second embodiment, the variance signal can be calculated based on an entropy formula.

According to one embodiment, the controller 30 measures an average speed variability over time, which serves as a variable for predicting the surrounding environment of the host vehicle 10. The speed variability parameter provides an indication of the predictability of the surrounding targets relative to the host vehicle, which may be used to determine the driving task demand on the driver of the host vehicle 10. For example, when driving on a country road during the daytime with low traffic, the driving task demand is relatively low. However, when driving in an urban setting during rush hour traffic, the driving task demand is generally much higher as the predictability of nearby vehicles on the roadway creates more of an unpredictable surrounding environment. As the traffic flow increases, various segments of roadways may become bottlenecks, thereby forcing drivers to slow down. As vehicle change lanes and bottlenecks emerge and subside, the surrounding traffic may change speed erratically. This constant and unpredictable speed variation places greater demand on the driver because the driver must be prepared to rapidly respond to the dynamic traffic behavior.

The controller 30 determines a driving task demand signal which is a prediction of the demand on the driver of the vehicle 10. The driving task demand signal, in turn, is used to control system devices. For example, devices associated with the entertainment and infotainment system 36 may be controlled to limit access thereto, thereby reducing distraction to the driver during high driving risk demand situations. As another example, devices associated with the forward collision warning system 38 may be controlled to act more quickly in situations where the driving task demand is relatively low, since it has been found that drivers are typically not as attentive to surrounding conditions in such situations.

Figure 3:
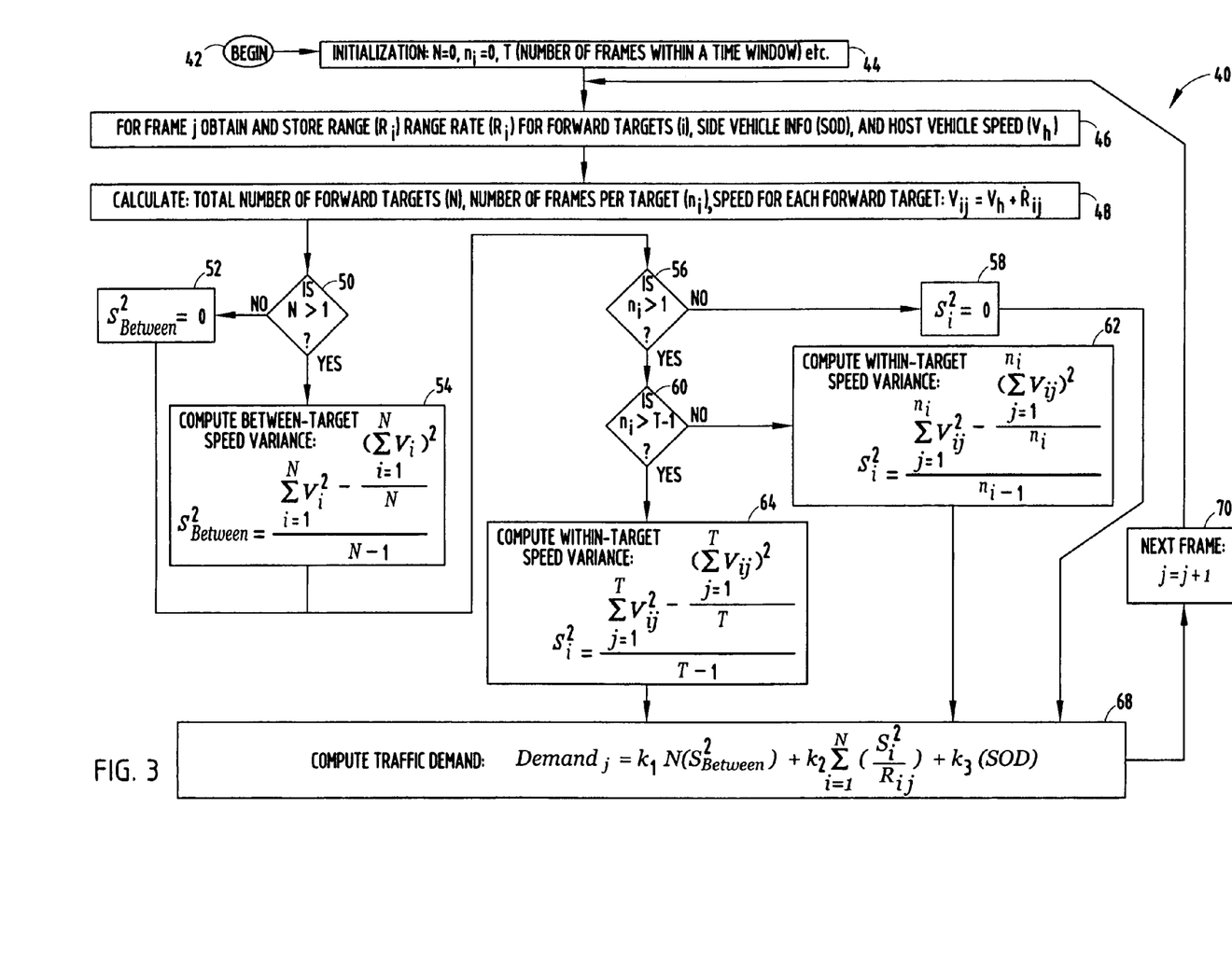
FIG. 3 is a flow diagram illustrating a routine for determining driving task demand according to a first embodiment.

Referring to FIG. 3, the driving task demand detection routine 40 is illustrated according to a first embodiment which employs the forward looking radar sensing system and the side view IR sensing system. Routine 40 begins at step 42 and performs an initialization in step 44. The initialization may include setting the total number of forward targets N equal to zero, setting the number of frames per target $n_i$ equal to zero, setting the number of frames within a time window T, and may include other initial settings.

Following the initialization step 44, routine 40 proceeds to step 46 to obtain and store range $R_i$, range rate $\dot{R}_i$ for each of the detected forward target objects i, the side vehicle information (30), and the host vehicle information $V_h$ for frame j. Frame j includes the sensed data at a particular time captured in frame j. Next, routine 40 calculates the total number of detected forward targets N, the number of frames per target $n_i$, and the speed for each detected forward target in step 48. The number of frames per target $n_i$ for target "i" is the number of frames in which target "i" has been detected since the last initialization. The speed calculation for each detected forward target i in frame j is identified as $V_{ij}$ and is calculated by summing the host vehicle speed with the range rate $\dot{R}_{ij}$. The range rate $\dot{R}_{ij}$ is the relative range rate of a detected object i in frame j relative to the host vehicle 10.

In decision step 50, routine 40 determines if the number of targets N is greater than one and, if not, sets a between-target speed variability, an example of which is the statistical between-target speed variance $S_{Between}^2$ shown in step 54 of FIG. 3, equal to zero in step 52 before proceeding to step 56. If the number of targets N is greater than one, routine 40 proceeds to step 54 to compute the between-target speed variance $S_{Between}^2$ as a function of an average computation of variance in speed of the detected forward target $V_i$ and a number targets N. This includes the summation of N target object speeds $$\sum_{i=1}^{N} V_i^2.$$

Proceeding to decision step 56, routine 40 determines if the number of frames per target $n_i$ is greater than one and, if not, sets a within-target speed variability, examples of which are the statistical within-targets speed variances $S_i^2$ shown in steps 62 and 64 of FIG. 3, equal to zero in step 58, and then proceeds to compute the traffic command signal in step 68. If the number of frames per target $n_i$ is greater than one, routine 40 proceeds to decision step 60 to determine if the number of frames per target $n_i$ is greater than T−1 and, if not, proceeds to step 62 to compute the within-target speed variance $S_i^2$ as shown as a function of an average computation of variance in speed for each detected forward target $V_{ij}$ and the number of frames per target $n_i$.

If the number of frames per target $n_i$ is greater than T−1, which is indicative of the final frame within the time window T, routine 40 proceeds to compute the within-target speed variance $S_i^2$ according to the function shown in step 64 as a function of an average computation of variance in speed for each detected forward target $V_{ij}$. In each of steps 62 and 64, the speed variance $S_i^2$ computes the summation of $n_i$ or T target object speeds. Following computation of the speed variance $S_i^2$ in either of steps 62 or 64, routine 40 proceeds to compute the traffic demand signal in 68.

Computation of the traffic driving task demand signal $Demand_j$ is computed as shown in the equation in step 68. The computation includes constants $K_1$, $K_2$, and $K_3$. The variable SOD represents the number of objects detected with the side detection system. If the side view detection sensors are not available, constant $K_3$ could be set equal to zero.

Once the traffic driving task demand signal $Demand_j$ is computed in step 68, routine 40 advances to the next frame j+1 in step 70, and then returns to step 46 to repeat the routine 40 for each successive frame. The computed traffic driving task demand signal $Demand_j$ can then be used in any of a number of applications to control various devices.

Figure 4:
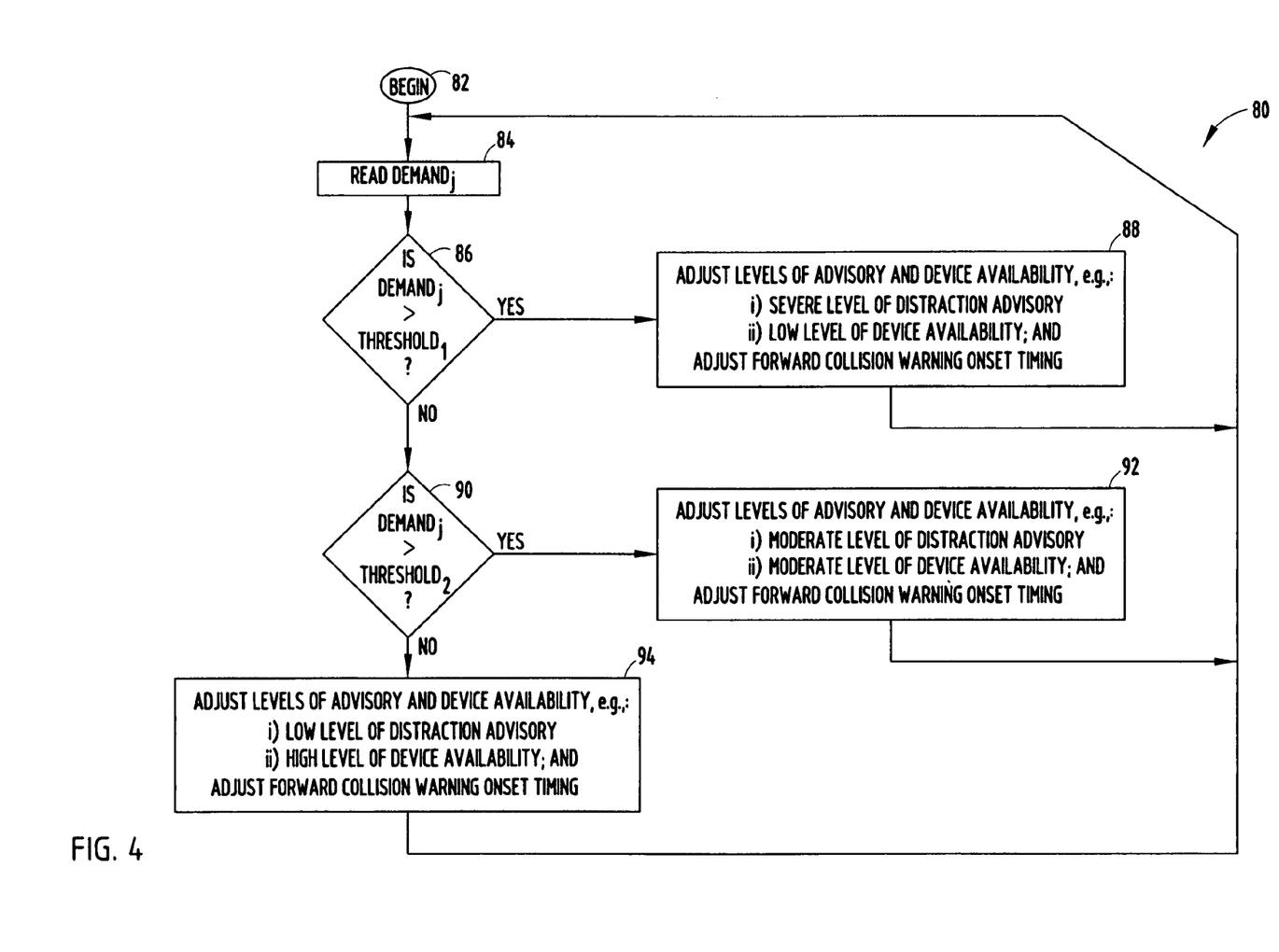
FIG. 4 is a flow diagram illustrating a routine for controlling a device as a function of the driving task demand signal.

Referring to FIG. 4, a routine 80 is shown employing the driving task demand signal $Demand_j$ to control one or more devices associated with the entertainment and infotainment system 36, according to one example. Routine 80 begins at step 82 and proceeds to read the driving task demand signal $Demand_j$ in step 84. In decision step 86, routine 80 determines if the demand signal $Demand_j$ is greater than a first threshold ($Threshold_1$) which is indicative of a high level of driving task demand. If the demand signal $Demand_j$ is greater than the first threshold, routine 80 proceeds to adjust the levels of advisory and device availability in step 88. For example, this may include selecting a severe level of distraction advisory and a low level of device availability. Thus, interface with certain devices can be limited during the severe level of distraction advisory. Additionally, the forward collision warning onset timing may be adjusted based on the driving task demand signal $Demand_j$.

If the demand signal $Demand_j$ is not greater than the first highest threshold, routine 80 proceeds to decision step 90 to determine if the demand signal $Demand_j$ is greater than a second lower threshold ($Threshold_2$), which is indicative of a more moderate driving task demand situation. If the demand signal $Demand_j$ is greater than the second threshold, routine 80 proceeds to step 92 to adjust the levels of advisory and device availability to a moderate level. For example, this may include setting the distraction advisory to a moderate level and the device availability of the entertainment and infotainment system to a moderate level. The forward collision warning onset timing may also be adjusted.

If the demand signal $Demand_j$ is not greater than the second threshold, indicative of lesser driving task demand situation, routine 80 proceeds to step 94 to adjust the levels of advisory and device availability so as to set the distraction advisory to a low level and the device availability to a high level. Additionally, the forward collision warning onset timing is also adjusted accordingly.

Following selection of the distraction advisory and device availability in steps 88, 92, and 94, routine 80 returns to step 84 to read the next demand signal Demand$_j$ and the routine 80 is repeated. Accordingly, routine 80 is able to adjust the levels of advisory and device availability of entertainment and infotainment system devices as a function of the driving task demand signal Demand$_j$ as compared to one or more threshold values.

Figure 5:
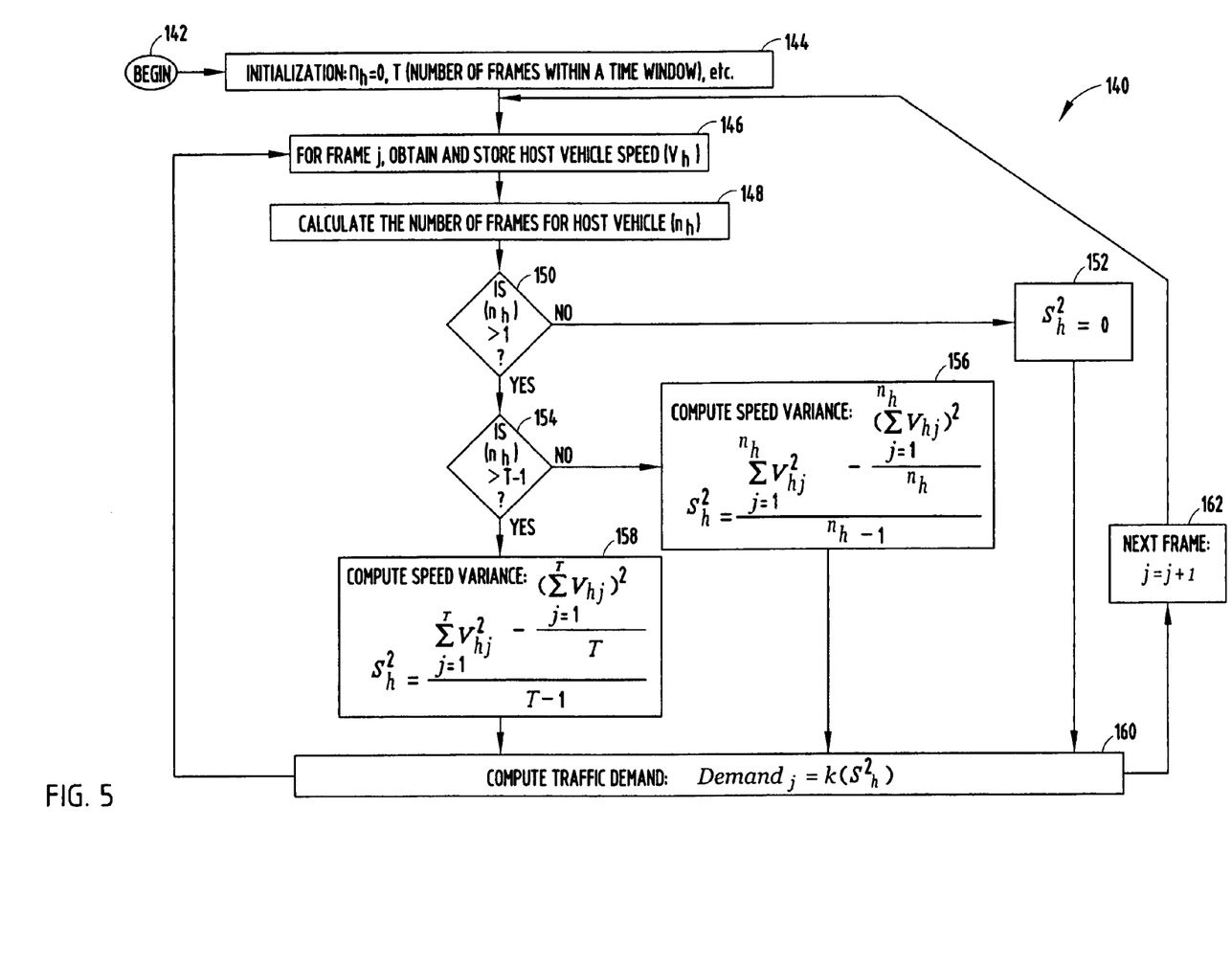
FIG. 5 is a flow diagram illustrating a routine for determining driving task demand according to a second embodiment.

Referring to FIG. 5, a driving task demand detection routine 140 is illustrated according to a second embodiment, absent the use of the forward looking radar system and the side view object detection system. Instead of sensing objects forward or to the side of the host vehicle, routine 140 determines the driving task demand signal Demand$_j$ based on speed of the host vehicle 10.

Routine 140 begins at step 142 and performs an initialization in step 144. The initialization includes setting the number of frames for the host vehicle $n_h$ equal to zero and setting the number of frames within a time window T. Next, in step 146, routine 140 obtains and stores the host vehicle speed $V_h$ for frame j in step 146. In step 148, routine 140 calculates the number of frames for the host vehicle $n_h$.

Proceeding to decision step 150, routine 140 determines if the number of frames for the host vehicle $n_h$ is greater than one and, if not, sets a speed variance $S_h^2$ equal to zero in step 152. Routine 140 then computes the demand signal Demand$_j$ in step 160. If the number of frames for the host vehicle $n_h$ is greater than one, routine 140 proceeds to decision step 154 to determine if the number of frames for the host vehicle $n_h$ is greater than the number of frames within a time window T−1 and, if not, computes the speed variance value $S_h^2$ as shown in step 156. The speed variance value $S_h^2$ is computed in step 156 as a function of a summation of the host vehicle speed $V_{hj}$ for each frame j based on $n_h$.

If the number of frames for the host vehicle $n_h$ is greater than T−1, routine 140 proceeds to compute the speed variance value $S_h^2$ in step 158. The speed variance value $S_h^2$ computation in step 158 includes computing the speed variance value $S_h^2$ as a function of the summation of host vehicle speed $V_{hj}$ for each frame based on the number of frames within the time window T. Following either of steps 156 or 158, the computation of the speed variance in routine 140 proceeds to compute the traffic driving task demand signal Demand$_j$ in step 160.

Computation of the driving task demand signal Demand$_j$ is computed by multiplying the speed variance value $S_h^2$ from steps 152, 156 or 158 with a constant value K. Following computation of the demand signal Demand$_j$, routine 140 proceeds to increment to the frame to the next frame j+1, and then returns to step 146. Accordingly, routine 140 is able to compute a driving task demand signal Demand$_j$ as a function of vehicle speed, absent the use of the forward looking radar system and the side view sensing system. This provides for a less costly and less complicated detection system.

Accordingly, the present invention advantageously determines a driving task demand signal as a function of speed variability, and allow control of devices as a function of the driving task demand signal. While specific equations have been shown for computing the speed variability and the demand signal, it should be appreciated that other speed variability related equations could be employed. For example, the speed variability could be computed as a function of average entropy of the surrounding traffic speed, or, alternately, as a function of the host vehicle speed. The use of entropy provides a determination as to unpredictability of the driving environment.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A method of providing a driving task demand signal indicative of external distraction to a vehicle operator based on speed variability of nearby objects, the method comprising the following steps:
    sensing a coverage zone in relation to a vehicle;
    detecting target objects in the sensed zone;
    measuring speeds of the detected target objects in the sensed zone in consecutive time frames;
    deriving a speed variability of the targeted objects from a between-target speed variability calculated from the measured speeds of a plurality of the detected target objects in one of the time frames, and
    generating the driving task demand signal from the derived speed variability of the targeted objects.

2. The method as defined in claim 1 wherein the calculation of the between-target speed variability comprises a statistical variance calculation.

3. The method as defined in claim 1 wherein the calculation of the between-target speed variability comprises an entropy formula.

4. The method as defined in claim 1, wherein the speed variability of the targeted objects is further derived from one or more within-target speed variabilities each derived from measured speeds of a different selected one of the detected target objects in a predetermined plurality of the time frames.

5. The method as defined in claim 4 wherein the calculation of each within-target speed variability comprises a statistical variance calculation.

6. The method as defined in claim 4 wherein the calculation of each within-target speed variability comprises an entropy formula.

7. The method as defined in claim 4, wherein the one or more within-target speed variabilities are derived from measured speeds of the same detected objects used in determining the between-target speed variability.

8. The method as defined in claim 7, wherein the speed variability of the targeted objects comprises a sum of the between-target speed variability and the one or more within-target speed variabilities.

9. The method as defined in claim 1 further comprising the step of controlling a device on the vehicle as a function of the driving task demand signal.

10. The method as defined in claim 9, wherein the device comprises any of an entertainment, information, and collision warning system.

11. The method as defined in claim 10 wherein driver access to at least one of an entertainment system and an information system is adjusted responsive to the driving task demand signal.

12. The method as defined in claim 10 wherein a collision warning onset timing is adjusted responsive to the driving task demand signal.

13. Apparatus for providing a driving task demand signal indicative of external distraction to a vehicle operator based on speed variability of nearby objects comprising:
    at least one sensor mountable on a vehicle to detect target objects in a sensing zone in relation to the vehicle;
    a processor configured to determine speeds of the detected objects in consecutive time frames, derive a speed variability of the targeted objects, and generate a driving task demand signal responsive to the derived speed variability of the targeted objects, wherein the speed variability of the targeted objects comprises a between-target speed variability derived from the measured speeds of a plurality of the detected target objects in one of the time frames.

14. The apparatus as defined in claim 13, wherein the processor is configured to calculate the between-target speed variability using a statistical variance calculation.

15. The apparatus as defined in claim 13, wherein the processor is configured to calculate the between-target speed variability using an entropy formula.

16. The apparatus as defined in claim 13, wherein the speed variability of the targeted objects further comprises one or more within-target speed variabilities each derived from measured speeds of a different selected one of the detected target objects in a predetermined plurality of the time frames.

17. The apparatus as defined in claim 16, wherein the processor is configured to calculate each within-target speed variability using a statistical variance calculation.

18. The apparatus as defined in claim 16, wherein the processor is configured to calculate each within-target speed variability using an entropy formula.

19. The apparatus as defined in claim 16, wherein the one or more within-target speed variabilities are derived from measured speeds of the same detected objects used in determining the between-target speed variability.

20. The apparatus as defined in claim 19, wherein the speed variability of the targeted objects comprises a sum of the between-target speed variability and the one or more within-target speed variabilities.

21. The apparatus as defined in claim 13 further comprising a device on the vehicle controllable as a function of the driving task demand signal.

22. The apparatus as defined in claim 21 wherein the device comprises any of an entertainment, information, and collision warning system.

23. The apparatus as defined in claim 22 wherein the controller adjusts vehicle driver access to at least one of an entertainment system and an information system responsive to the driving task demand signal.

24. The apparatus as defined in claim 22 wherein the controller adjusts a collision warning onset timing responsive to the driving task demand signal.

* * * * *